May 21, 1935.  V. H. HURT  2,001,785
METHOD OF MAKING INFLATABLE ARTICLES
Filed June 29, 1933  2 Sheets-Sheet 1
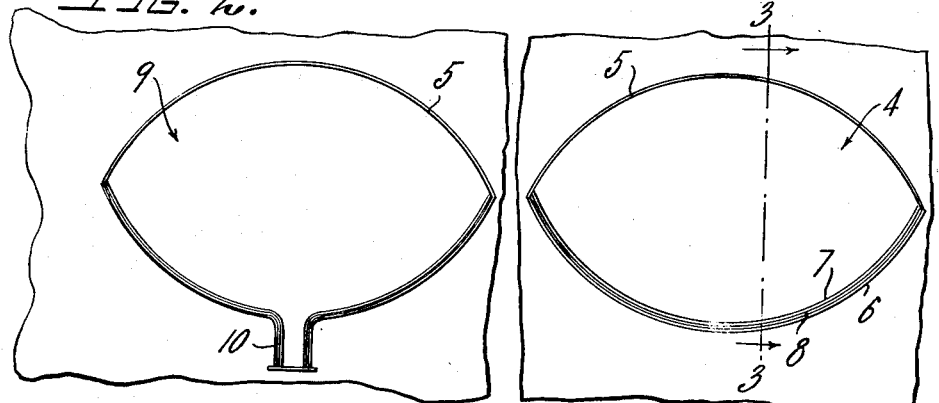
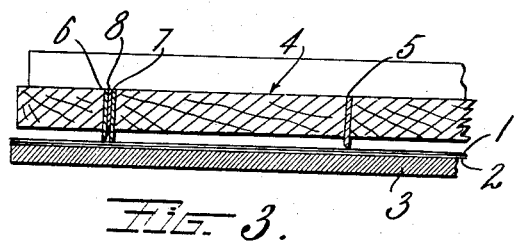
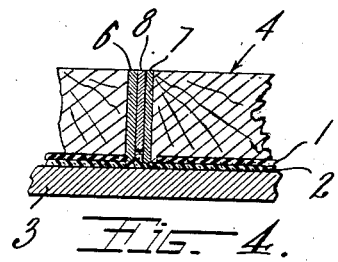
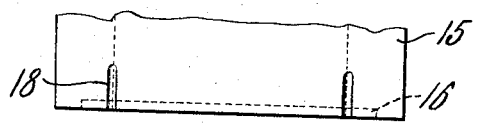
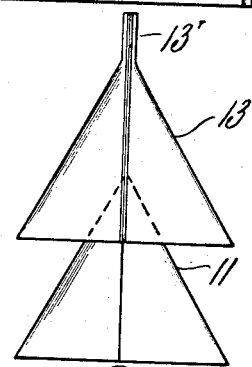
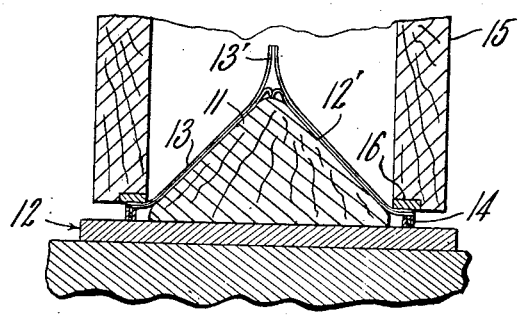
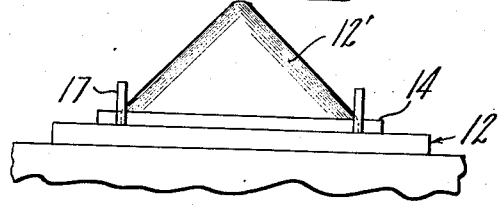
INVENTOR
VICTOR H. HURT
BY
ATTORNEY May 21, 1935.   V. H. HURT   2,001,785
METHOD OF MAKING INFLATABLE ARTICLES
Filed June 29, 1933   2 Sheets-Sheet 2

INVENTOR
VICTOR H. HURT
BY
ATTORNEY

Patented May 21, 1935

2,001,785

UNITED STATES PATENT OFFICE 2,001,785

METHOD OF MAKING INFLATABLE ARTICLES

Victor H. Hurt, Naugatuck, Conn., assignor, by mesne assignments, to United States Rubber Company, New York, N. Y., a corporation of New Jersey Application June 29, 1933, Serial No. 678,148

5 Claims. (Cl. 154—2)

This invention relates to a method of making inflatable articles and more particularly to a method for making inflatable rubber articles such as play balls, etc.

In the making of inflatable rubber articles such as play balls and other toys, one method in use has been to cut out sections of sheet rubber stock and then join these sections by superposing the edges and uniting them by hand with a roller or other tool. This method involves a great many manual operations, and as such articles must be sold cheaply, it is not an economical procedure. In another method, play balls have been made by froming a section of a cylinder from sheet rubber stock and applying top and bottom sheet rubber closures, the joints in this case also being made manually. A serious objection to this method is that the balls so made are not truly spherical unless inflated to the proper degree.

An object of my invention is to provide a rapid, economical and simple method for making play balls and other inflatable rubber articles.

Another object is to provide a method of making hollow inflatable articles in which all joints are made by a cut-seaming process.

Another object is to provide an improved play ball or similar inflatable rubber article.

Other objects will appear from the detailed description and drawings, in which latter:

Figure 1 is a bottom plan view of one form of cutting and cut-seaming die used in carrying out the invention;

Figure 2 is a similar view of another die used;

Figure 3 is a sectional view on the line 3—3 of Fig. 1, showing a cutting and cut-seaming die in position for use;

Figure 4 is an enlarged section showing the position of the cut-seaming edge of the die illustrated in Fig. 3 after operation;

Figure 5 is a sectional view illustrating the manner in which two cut and cut-seamed elements may be cut-seamed together to form a complete article;

Figure 6 is a view showing the separated parts of Fig. 5;

Figure 7:
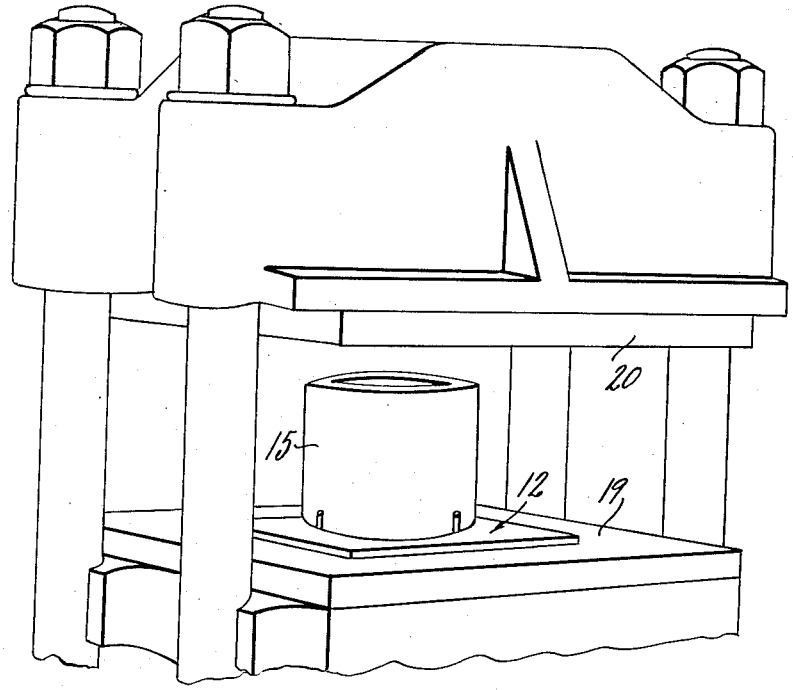
Figure 7 is a broken view of a press, showing the die elements in position to be operated upon by the press.
Figure 8:
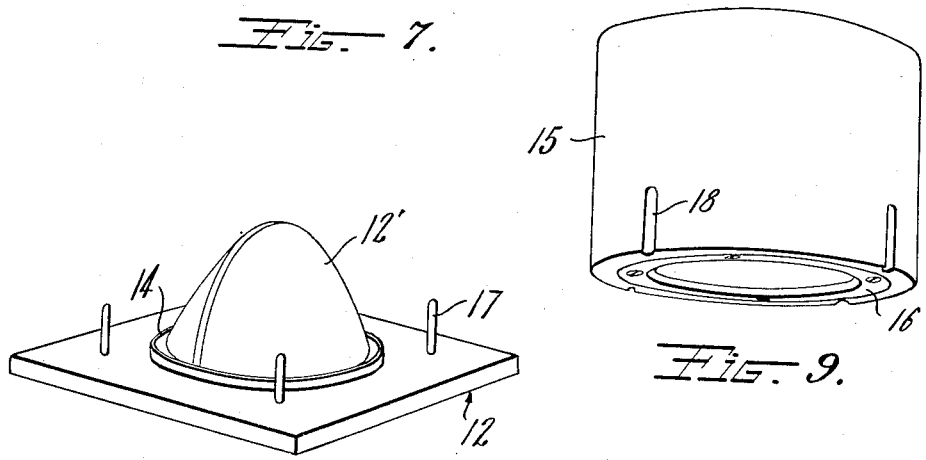
Figure 8 is a perspective of one cut-seaming die.
Figure 9:
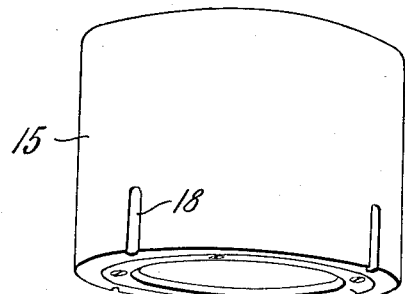
Figure 9 is a perspective of the cooperating die.

While the invention is capable of use in the manufacture of various inflatable rubber articles, a specific form will be described for the making of a rubber play ball. In the description the apparatus used in carrying out the method will be described concurrently with the description of the method.

Referring to the drawings the method is carried out by first superposing two sheets of suitable rubber stock 1 and 2, these sheets being first preferably dusted with some material such as zinc stearate or sulphur, which will prevent accidental adhesion of the sheets at points where it is not desired to unite them. Materials such as zinc stearate and sulphur will be absorbed by the rubber during the vulcanizing process and hence will not in any way weaken the seams where the rubber is united. When materials such as zinc stearate or sulphur are used, it is desirable to inject talc or similar powder into the finished article before it is vulcanized, in order to prevent internal adhesion of the walls of the article during vulcanization. As an alternative to the dusting, the sheets may be separated at desired points by thin paper or other forms of separators.

Freshly calendered and unvulcanized sheet rubber is tacky or adhesive and more or less plastic, so that portions of such stock can be easily cut and also easily united by pressure. By the present method the two sheets of rubber stock 1 and 2 are superposed and placed between the lower plate 3 and the upper cutting and cut-seaming die 4, as shown in Fig. 3. The die 4 may be formed by suitable sheet metal mounted in wood or other suitable material as shown in Fig. 3, and comprises a cutting edge 5 of curved outline, the ends of which are joined to the oppositely curved cut-seaming portion of the die, which latter is formed of a cutting edge 6, a seaming edge 7, and an interposed separator 8. This die will cut and cut-seam from two superposed sheets of rubber a ball element of the shape of the die shown in Fig. 1. Two of these elements may then be cut-seamed together as later described to form a ball. While the inflating tube for the ball may be made separate and connected to the ball in the usual manner, in the preferred form of the invention the inflating tube is made integral with one of the elements of the ball, and to accomplish this result a second die 9 is made with a curved cutting edge 5 and a cutting and cut-seaming edge similar in general curvature to that just described, but this cut-seaming edge is formed with an extension 10 so as to cut out a ball element of the shape of the die shown in Fig. 2. The extension 10 cut-seams two narrow superposed portions of the sheet rubber to form an inflating tube.

It will be seen that with either of the cutting dies just described, two plies of superposed rubber stock will be cut along the edges 5 of the dies, without however, appreciably uniting the cut edges of the upper and lower plies. However, with either of the dies the opposite cut-seaming edge will not only cut the superposed plies but will seam them together. The two elements of the ball thus formed by the dies will be alike in all respects except that one will have an inflating tube.

The ball element 11 formed by die 4 is then opened up along the cut edges and inverted on itself along the cut-seamed edge. This inverted ball element is then placed on the lower die 12 shown in Fig. 5, the second ball element 13 having the inflating tube 13' is opened along its cut edges and superposed on the inverted ball element 11 with its cut edges superposed on and in substantial registry with the cut edges of the ball element 11. The lower die 12 shown in Fig. 5 is provided with a dome-shaped part 12' which may be made of wood or any other suitable material, and surrounding the dome shaped portion 12' is a cut-seaming edge 14 similar in construction to the cut-seaming edge shown in Fig. 4, except that it extends all around the die. The cut-seaming operation to unite the ball elements 11 and 13 is carried out by pressing a second die 15 on the cut-seaming edge 14. This second die may be made of any suitable material such as wood, and in such case may be provided with an anvil 16 of metal or any other suitable material. In order to center the two dies, the lower die 12 may be provided with the centering pins 17 adapted to engage the recesses 18 in the upper die.

Any suitable means for applying pressure to bring the dies into cutting relation may be used, and in Fig. 7 there is shown an ordinary form of press having a lower platen 19 and an upper platen 20, which are brought together to force the dies 12 and 15 into cutting relation.

Figure 10:
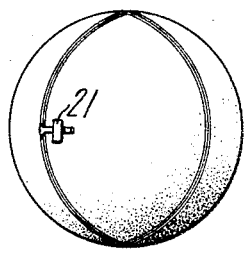
Figure 10 is a perspective of a ball made by the method.

It will be seen that by the method described, elements composed of superposed segments of sheet rubber stock may be cut out from superposed sheets of rubber, one portion of the edge of the cut-out ball element being merely cut without uniting the edges of the upper and lower plies, while the balance of the edge of the ball element is not only cut but seamed together. By reason of the dusting of the stocks with zinc stearate or sulphur, or by reason of the interposition of a paper or other separator, the upper and lower plies of each element will remain separate so that they can be readily opened out along their cut edges. These free cut edges are then cut-seamed together in the manner just described to form a complete ball or other article. A retaining strap or pocket 21 of rubber is attached to the ball adjacent the inflating tube as shown in Fig. 10. When the ball is inflated for use the inflating tube is folded or rolled upon itself and tucked under the strap 21. The completed article may then be vulcanized in any suitable manner.

While in the specific embodiment described, two elements, each composed of two segments of sheet rubber united along part of their outline only, have been united along their free cut edges to form a complete article, it is obvious that by changing the shape of the segments an article may be formed by the use of more than two elements. In such case the two segments forming each element will still be united along one edge by a cut-seaming operation, and a desired number of elements may then be united to form a complete article, two elements being united at a time along a portion of their cut edges by a cut-seaming operation. Also, while in the specific embodiment described, and as shown in Fig. 5, one of the elements 11 to be joined has been inverted, the only purpose in such inversion is to provide a play ball in which all of the seams are outwardly projecting in the finished article. Obviously, if the element 11 is not inverted while joining it to an adjacent element, the finished article will have some of its seams outwardly projecting and others inwardly projecting. Either arrangement may be used depending on the appearance desired in the finished ball.

Having thus described my invention, what I claim and desire to protect by Letters Patent is:

1. A process for making inflatable articles which comprises superposing two sheets of rubber stock, completely cutting out therefrom two superposed segments of the article and simultaneously seaming together a portion of their edges to form one element, repeating said last operation on another portion of superposed stocks to form a second element, opening one of said elements along its free cut edge and inverting it, associating the inverted element with the other one with free cut edges of both elements superposed and substantially in registry, and cut-seaming together the registered cut edges.

2. A process for making inflatable articles which comprises superposing two sheets of rubber stock, completely cutting out therefrom two superposed segments of the article and simultaneously seaming together a portion of their edges to form one element, repeating said last operation on another portion of superposed stocks to form a second element, opening one of said elements along its free cut edge and inverting it, disposing the inverted element within the other one with the free cut edges of both elements substantially in registry, and cut-seaming together the registered cut edges.

3. A process for making inflatable articles which comprises superposing two sheets of rubber stock, completely cutting out therefrom two superposed segments of the article and simultaneously seaming together a portion of their edges to form one element, similarly forming another element but with a cut-seamed projecting tubular extension to form a filling opening, opening said first element along its free cut edge and inverting it, associating the inverted element with the other one with free cut edges of both elements superposed and substantially in registry, and cut-seaming together the registered cut edges.

4. The steps in a process for making inflatable articles which comprise, superposing two sheets of rubber stock, completely cutting out therefrom two superposed segments of the article and simultaneously seaming together a portion of their edges to form one element, repeating said last operation on another portion of superposed stocks to form a second element, opening said elements along their free cut edges, superimposing the opened elements on a form with at least portions of their free cut edges projecting laterally of the elements and substantially in registry, and cut-seaming together the thus registered cut edges.

5. A process for making inflatable articles which comprises, superposing two sheets of rubber stock, completely cutting out therefrom two superposed segments of the article and simultaneously seaming together a portion of their edges to form one element, repeating said last operation on other portions of superposed stocks until a sufficient number of elements have been formed to complete the article, opening a pair of said elements along their free cut edges and superimposing the opened elements on a form with at least a portion of their free cut edges projecting laterally of the elements and substantially in registry, cut-seaming together the registered cut edges, and successively uniting the remaining elements in a similar manner to the two previously united elements until the article is completed.

VICTOR H. HURT.